United States Patent
Rockhold

(10) Patent No.: US 9,463,598 B2
(45) Date of Patent: Oct. 11, 2016

(54) IN-FILLING FOR ADDITIVE MANUFACTURING

(75) Inventor: Benjamin E. Rockhold, Brooklyn, NY (US)

(73) Assignee: MakerBot Industries, LLC, Brooklyn, NY (US)

(*) Notice: Subject to any disclaimer, the term of this patent is extended or adjusted under 35 U.S.C. 154(b) by 665 days.

(21) Appl. No.: 13/477,998

(22) Filed: May 22, 2012

(65) Prior Publication Data
US 2013/0313743 A1 Nov. 28, 2013

(51) Int. Cl.
*G06F 19/00* (2011.01)
*B29C 67/00* (2006.01)

(52) U.S. Cl.
CPC ....... *B29C 67/0088* (2013.01); *B29C 67/0055* (2013.01)

(58) Field of Classification Search
CPC .................................................. B29C 67/0088
USPC ............... 264/401, 497; 700/119, 120
See application file for complete search history.

(56) References Cited

U.S. PATENT DOCUMENTS

| 6,936,212 | B1* | 8/2005 | Crawford | B28B 1/00 264/308 |
| 2005/0015173 | A1* | 1/2005 | Ohmori et al. | 700/119 |
| 2006/0268297 | A1* | 11/2006 | Han | 358/1.9 |
| 2012/0074605 | A1* | 3/2012 | Nakagawa et al. | 425/145 |

OTHER PUBLICATIONS

"Untangling Skeinforge: Infill", MakerBot Blog, Posted by user "Makerblock" on May 13, 2011, available at http://www.makerbot.com/blog/2011/05/13/untangling-skeinforge-infill/, 4 pages.
REPRAP Wiki, "Java software configuration file", available at http://reprap.org/wiki/Java_Software_Preferences_File/de, English Translations NPL-115 Nov. 26, 2011, 19 Pages.
REPRAP Wiki, "Java software configuration file", available at http://reprap.org/wiki/Java_Software_Preferences_File/de, German Translations NPL-115 Nov. 26, 2011, 19 Pages.

* cited by examiner

*Primary Examiner* — Timothy Kennedy
(74) *Attorney, Agent, or Firm* — Strategic Patents, P.C.

(57) ABSTRACT

Iterative techniques are disclosed for in-filling enclosed, interior volumes of three-dimensional shapes during an additive fabrication process.

12 Claims, 4 Drawing Sheets

IN-FILLING FOR ADDITIVE MANUFACTURING

BACKGROUND

A variety of additive fabrication techniques exist to reproduce essentially any three dimensional structure with a desired exterior. However, for a structure with a given exterior, there are many, and potentially infinite, ways to fill enclosed, interior volumes, a process generally referred to as in-filling. For example, one can fill the entire volume with build material, which may produce a maximally durable structure but takes longer to build and uses more material than other alternatives. Alternatively, one can forego filling the structure's interior with any build material at all. This leads to a minimum use of build material and a reduction in build time, but may produce a highly fragile structure.

Existing solutions to in-filling generally rely on simple geometric patterns such as a square grid, along with a few simple approaches to boundary conditions where the simple geometric pattern does not match an exterior wall. There remains a need for improved in-filling techniques for additive fabrication.

SUMMARY

In general, in one aspect, a surface of a desired structure having an unspecified interior configuration is identified. The desired structure is enclosed in a cell. An interior configuration if identified by iteratively: partitioning the cell into sub-cells; discarding sub-cells that are entirely contained in an exterior of the structure; and merging subcells that are entirely contained in an interior of the structure and satisfy a merging condition. The iterations are carried out until a stopping condition is satisfied. The structure is printed with the identified interior configuration on a three-dimensional printer.

Implementations may have one or more of the following features. The cell and sub-cells are cubical. Partitioning cells includes partitioning a cube into eight mutually congruent cubes. The merging condition includes the condition that a given cell is adjacent to a specified number of other cells that are all contained in the interior of the structure. The specified number is seven. The merging the sub-cells is performed only in a specified direction. The specified direction is selected from the group consisting of horizontal and vertical. The cell and sub-cells are tetrahedral. Partitioning includes barycentric subdivision. The stopping condition allows partitioning to be carried out to a maximum resolution of the three-dimensional printer. The stopping condition includes a constraint on at least one of a total required build material, a total required build time, a desired density of the structure, a minimum void volume, and a maximum void volume. The merging condition includes a constraint selected from the group consisting of: a constraint on an overall mass of the structure, a constraint on a density of the structure, and a constraint on a location of a center of mass of the structure.

Other aspects include other combinations of the features recited above and other features, expressed as methods, apparatus, systems, computer program products, and in other ways. Other features and advantages will be apparent from the description and from the claims.

DESCRIPTION OF DRAWINGS

Embodiments of the invention described herein may be understood by reference to the following figures, where like reference numbers refer to like structures. The following figures are provided by way of example and not of limitation.

DETAILED DESCRIPTION

A "three-dimensional printer," as used herein, refers to any device that is capable of automatically fabricating a desired three dimensional structure, given a suitable mathematical or algorithmic description of the structure. Numerous additive fabrication techniques are known in the art for fabricating three-dimensional structures from computer models using various materials. Terms such as "three-dimensional printer" and "three-dimensional printing" are intended to include any and all such techniques that might benefit from the in-filling techniques disclosed herein.

In one embodiment, a three-dimensional printer can have one or more nozzles each movable in one, two, or three dimensions, and each having access to one or more supplies of various build materials—an additive fabrication technique commonly referred to as fused deposition modeling. Examples of such three-dimensional printers include, but are not limited to, devices described in U.S. Pat. Pub. No. 2012/0046779, filed on Aug. 18, 2010 and U.S. Pat. Pub. No. 2012/0092724, filed on Dec. 8, 2011, the entire contents of which are incorporated by reference herein.

A user of a three-dimensional printer may provide a computer model for fabrication. The model may characterize a number of exterior surfaces that fully enclose interior volumes, where the user, or the model, may explicitly or implicitly define void spaces. The techniques described below address interior configurations for such fully enclosed interior volumes, and may provide an advantageous trade-off between minimizing required build material and time, and maximizing structural integrity of the resultant structure.

Figure 1:
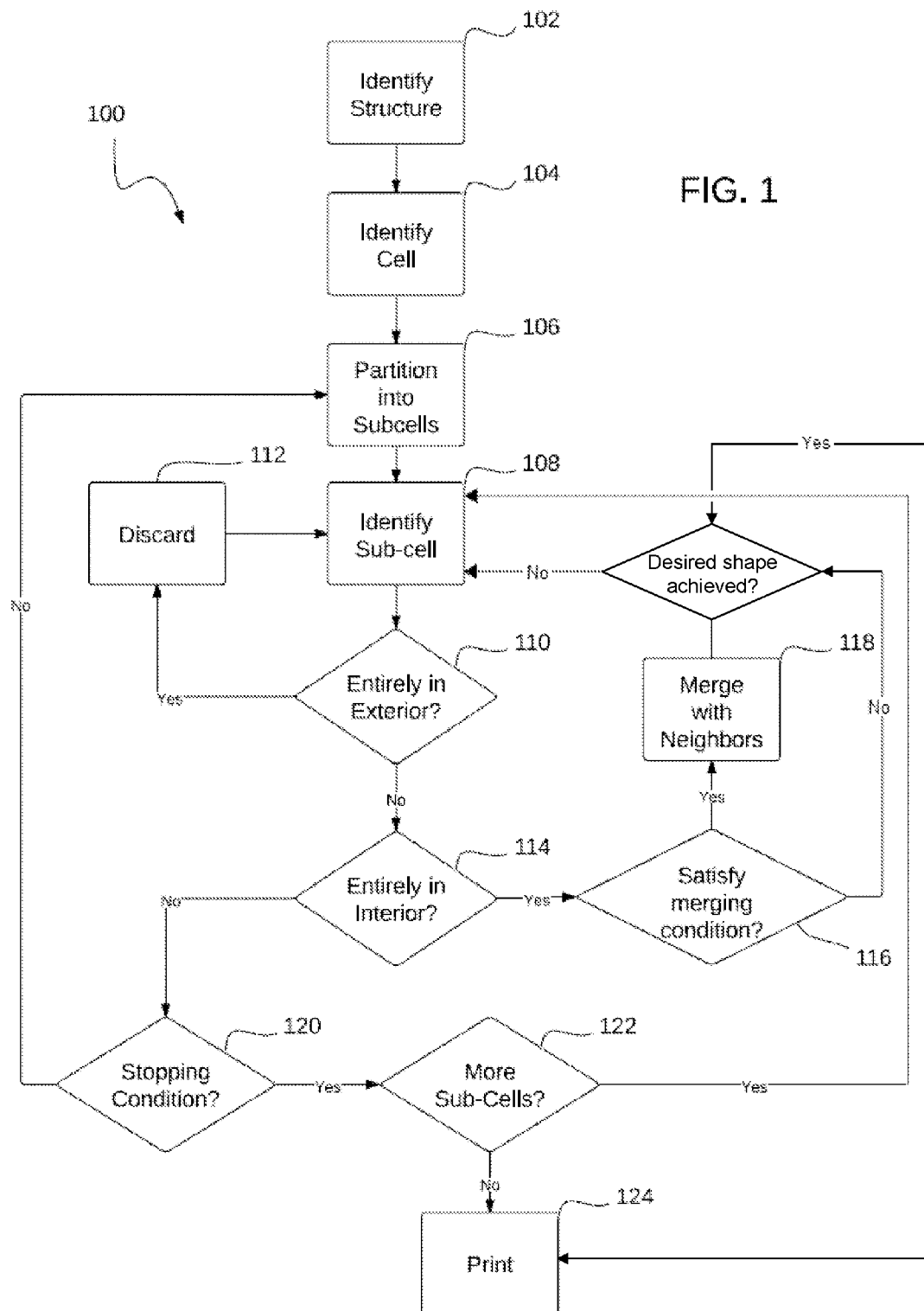
FIG. 1 is a flow chart of a process for printing a structure with a desired exterior surface.

FIG. 1 is a flow chart of a process for printing a structure with a desired exterior surface. It will be convenient to describe the steps of process 100 with references to exemplary representations of the structure shown in FIGS. 2-5.

Figure 2:
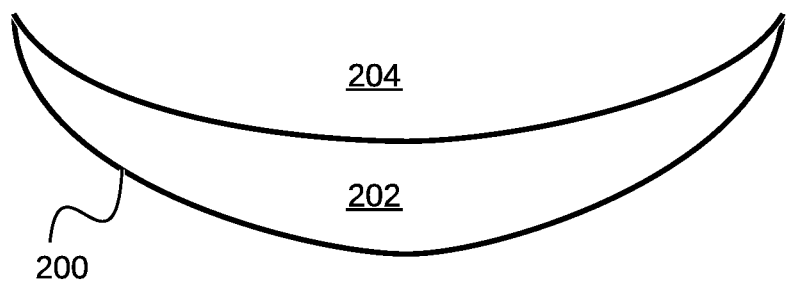
FIG. 2 shows an exemplary surface having an interior and an exterior.

In step 102, a surface is identified. For example, FIG. 2 shows an exemplary surface 200 that defines an interior 202 and an exterior 204. For clarity in what follows, the surface 200 is shown only in a two dimensional cross-section, although often the surface 200 will be three dimensional. It will further be understood that a three-dimensional shape may include a cross section that varies along its depth, as would be typical of the exterior of anything but the simplest of three-dimensional models. At the same time, a computerized model of an object for fabrication may be suitably separated into a number of different enclosed volumes each suitable for independently in-filling as contemplated below.

In some implementations, the surface 200 can be identified in an electronic form suitable for the particular three-dimensional printer and computer executing these techniques. For example, the surface 200 can be characterized in an STL ("stereo lithography") file, a CAD ("computer aided design") file, or any other file format or the like suitable for computerized representations of three-dimensional shapes.

In some implementations, the file can be obtained from the output of a three-dimensional scanner, or from a three-dimensional modeling program, or some combination of these. In general, any file or data structure describing the geometry of the desired surface 200 that can be converted by a computer to printing instructions interpreted by the three-dimensional printer can be used. It will be noted that the techniques described herein may, for example, be usefully implemented in a processor that converts a three-dimensional model from an STL file to G-code or any other machine-ready instructions that control a tool head or the like of a three-dimensional printer.

In practice, it will be understood that the surface 200 identified may have some nonzero thickness. That thickness is not pertinent to the techniques described below. In particular, a "surface" as used herein is used simply to delineate between volumes or regions of space, in which the volumes or regions is filled in a particular manner. In some implementations (for example, in successive or parallel applications of the techniques described below), a surface associated with one application may contain a surface associated with another application.

Figure 3:
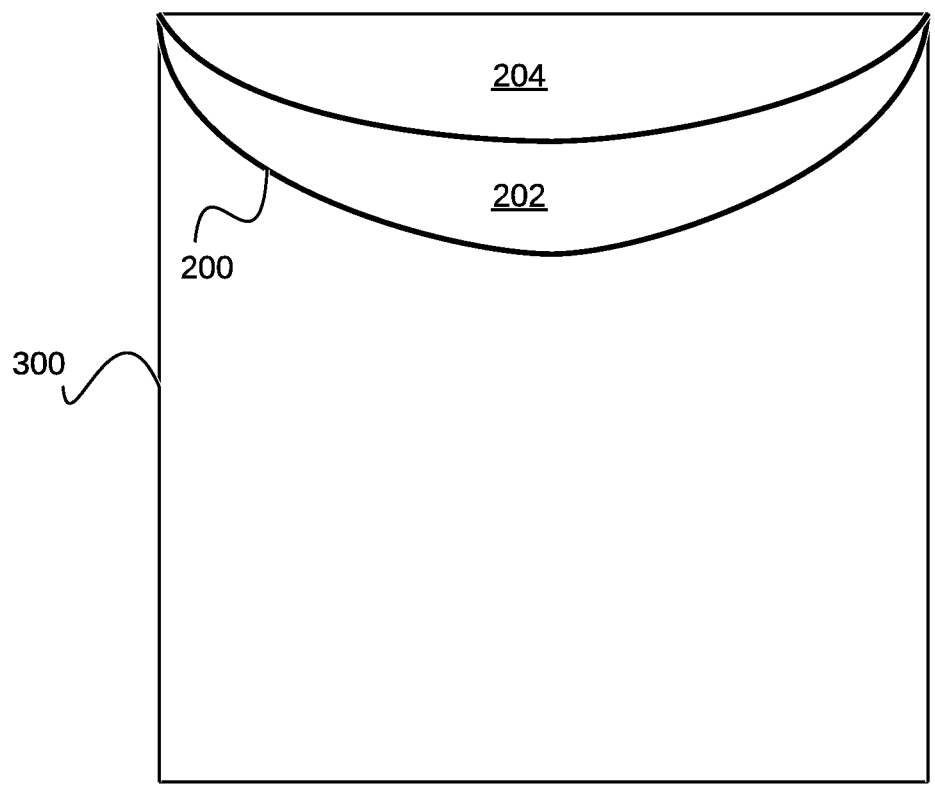
FIG. 3 shows an exemplary surface enclosed by a cell.

In step 104, a cell is identified that contains the specified surface. In this document, a "cell" refers to any bounded volume having a known geometry. In some implementations, cells can include platonic solids (e.g., tetrahedrons, cubes, octahedrons, dodecahedrons, icosahedrons), prisms, or other shapes. In some implementations, all the cells used in the techniques described below have the same shape (e.g., cubes), but in general this need not be the case. For example, collections of cells can be defined according to a crystallographic or quasi-crystallographic pattern. By way of example, FIG. 3 shows, in cross-section, the result of step 104: the exemplary surface 200 of FIG. 2 enclosed by a cell 300.

In step 106, the cell is partitioned into sub-cells. The prefix "sub-" is one of convenience only, and is used in reference to the hierarchy that naturally develops as cells are partitioned one or more times. However, there is no inherent difference between a "cell" and a "sub-cell." In particular, what is referred to as a "sub-cell" during one iteration of the process 100 may be referred to as a "cell" during a subsequent iteration.

In what follows, reference is made to "walls" of a cell. For cells having a polytope geometry, "walls" refer to faces of the polytope. In general, a "wall" can refer to any predefined portion of a cell boundary at which two cells interface.

Figure 4:
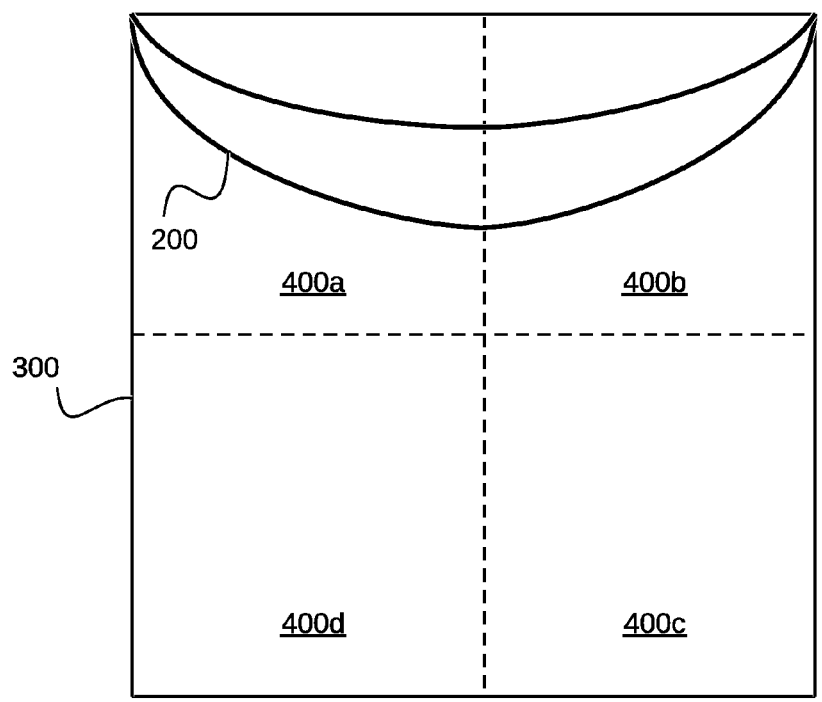
FIG. 4 shows a cell divided into sub-cells.

In some implementations, a cubical or rectangular prismatic cell can be partitioned into eight mutually congruent sub-cubes or sub-rectangular prisms by dividing each face of the cell in half by planes. For example, FIG. 4 shows the cell 300 of FIG. 3 divided into sub-cells 400a-400d by this procedure, with the sub-cells indicated by dashed lines. Because FIG. 4 shows a cross-sectional view, only four sub-cells are shown; however, in three dimensions there are eight sub-cells for this example.

In another example, barycentric subdivision can be used with tetrahedral cells. Still other partitioning techniques are possible. It will also be appreciated that the two-dimensional or three-dimensional shapes used for cells and sub-cells may be predetermined shapes, or may be dynamically selected according to the generalized geometry (or geometries) and/or specific surface features of an object.

In step 108, one of the newly created sub-cells is identified and the following steps are carried out with respect to that sub-cell. In decision 110, it is determined whether the sub-cell is entirely in the exterior 204 of the surface 200. For example, sub-cells 400c and 400d are entirely in the exterior 204 of the surface 200. Such sub-cells are discarded (step 112).

If the identified sub-cell is not entirely in the exterior of the structure, next it is determined whether it is entirely in the interior of the structure (decision 114). If so, then decision 116 determines whether a merging condition (discussed more fully below) is met with respect to neighboring sub-cells. If so, those sub-cells are merged into a single structure; that is, the interior walls between those sub-cells are eliminated (step 118). If the merging condition is not met, the process 100 loops back to identify the next sub-cell of the partition. If the merging condition is met, then the sub-cell is merged with its neighbors as specified by the merging condition. That is, the shared interior walls between the sub-cells and the neighbors are removed, thereby combining various sub-cells into a larger cell.

In some implementations, "neighbors" may include all cells that are adjacent to the identified cell. In some implementations, "neighbors" may include less than all such cells. For example, some implementations may involve merging only in specified directions (e.g., horizontally or vertically).

Figure 5:
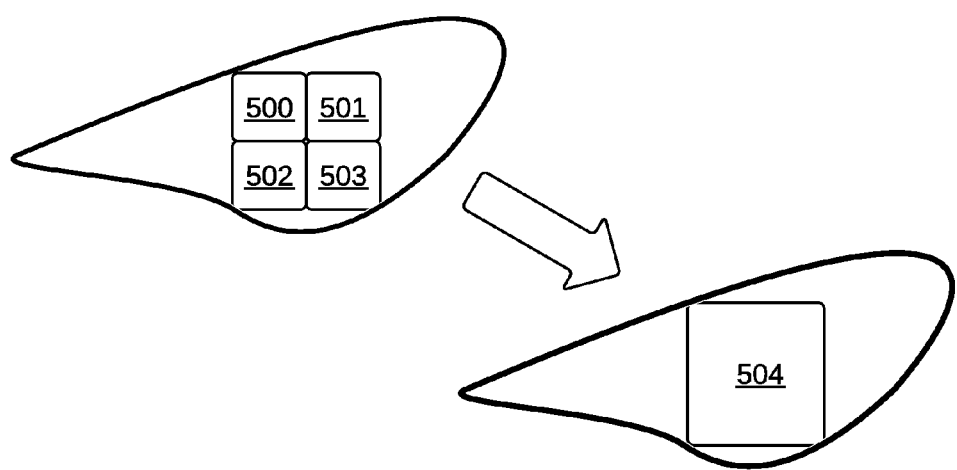
FIG. 5 shows a number of sub-cells merged into a cell.

FIG. 5 is a schematic depiction of the merging process. If the sub-cells 500, 501, 502, and 503 satisfy the merging condition, then step 118 of FIG. 1 is operable to produce a single merged cell 504.

In some implementations, a merging condition can be specified by a number and/or type of neighbors a given cell has. Insofar as these conditions may depend on the sub-cell under consideration and its neighbors, these conditions may be characterized as "local." For example, the condition that sub-cells are merged if they border three other sub-cells that are all contained in the interior of the structure is satisfied by the example of FIG. 5. Similarly, interpreting FIG. 5 to depict a cross-sectional view, another merging condition may include the requirement that the given sub-cell borders seven adjacent sub-cells that are all contained in the interior of the structure. Other exemplary local merging conditions may include the conditions on the relative orientation of neighbors (e.g., imposing separate conditions for horizontal neighbors or vertical neighbors), conditions on neighbors' neighbors, condition on the shape or size of one or more sub-cells (e.g., one or more sub-cells being of equal volume), conditions involving user-supplied preferences for the positions occupied by certain cells (e.g., a preference that a certain volume necessarily be empty or necessarily not be empty), conditions on the total volume of any voids (e.g., voids must have less than or greater than a certain volume), etc.

Merging conditions may also contain "global" constraints; that is, constraints that do not necessarily depend on the location of the specific sub-cell under consideration. For example, a merging condition may include the constraint that the overall mass or density of the structure or portion thereof be less than or greater than a pre-determined threshold, that the center of mass of the structure or portion thereof be at a particular location, or various other constraints.

Merging conditions may also include exceptions to global or local constraints. For example, specific configurations or sub-structures may be defined that are excluded from consideration for merging, or are dealt with according to other algorithms or techniques. Similarly, different merging conditions may apply to different types of specific configurations or sub-structures. For example, merging conditions for support structures may be defined to provide strong, rigid structures. In some implementations, such exceptions or preferences can be identified by metadata in the CAD, STL, G-code, or other file defining the structure.

Merging conditions are not limited to the examples above, may include combinations of any of the foregoing, and/or any other constraint that can be unambiguously implemented by computer.

Whether or not sub-cells are merged in step 118, process 100 loops back to step 108, identifying another sub-cell.

Referring back to FIG. 1 and decisions 110 and 114, if the sub-cell is neither entirely in the exterior nor entirely in the interior of the surface 200, then it is determined whether a stopping condition is met (decision 120).

In some implementations, stopping conditions can relate to the maximum resolution of the printer. For example, one exemplary stopping condition is satisfied if further partitioning (in step 106) would require a resolution beyond the hardware capabilities of the printer. Similarly, an operator can impose a minimum cell volume, irrespective of the printer's maximum resolution. Other stopping conditions may include constraints or conditions on the total required build material or build time for the structure or portion thereof, density of the structure or portion thereof, combinations of the foregoing, and/or any other constraints or conditions that can be implemented by computer.

If a stopping condition is met with respect to a given sub-cell, the process 100 continues by determining whether there are any remaining sub-cells for which the stopping condition has not been met (decision 122). If so, one of those cells is selected and the process continues with respect to that cell. If there are no more sub-cells remaining, the structure may be printed with the interior filled by any remaining walls of surviving (that is, non-discarded and non-merged) sub-cells (step 124).

In one aspect, a thickness for fabrication of the walls may be specified. In another aspect, the interior of each surviving sub-cell may be further in-filled with any regular or irregular geometry suitable to the cell base shape. These post-processing steps may, for example, be usefully employed to reinforce a structure where structural integrity is to be emphasized over weight, build time, and/or material usage.

It will be appreciated that numerous variations to the above method are possible without departing from the scope of the invention. For example, many of the steps described above are parallelizable, such as various regions of a volume may be partitioned and merged in parallel, and then combined using any suitable techniques to cover an entire working volume for an object. As another example, stopping conditions may be implemented between multiple steps of the method, and certain steps may be repeated numerous times before proceeding to another step. As a further example, in-filling may apply a variety of boundary conditions and techniques to address space (in two or three dimensions) between the cells established above and an exterior surface of an object to be manufactured. This remaining space may be filled entirely, or may consist of predetermined or dynamically calculated fill patterns according to any suitable algorithm. Still more generally, the various steps described above may be removed, supplemented, reordered, or modified in any manner that would be readily apparent to one of ordinary skill in the art.

Figure 6:
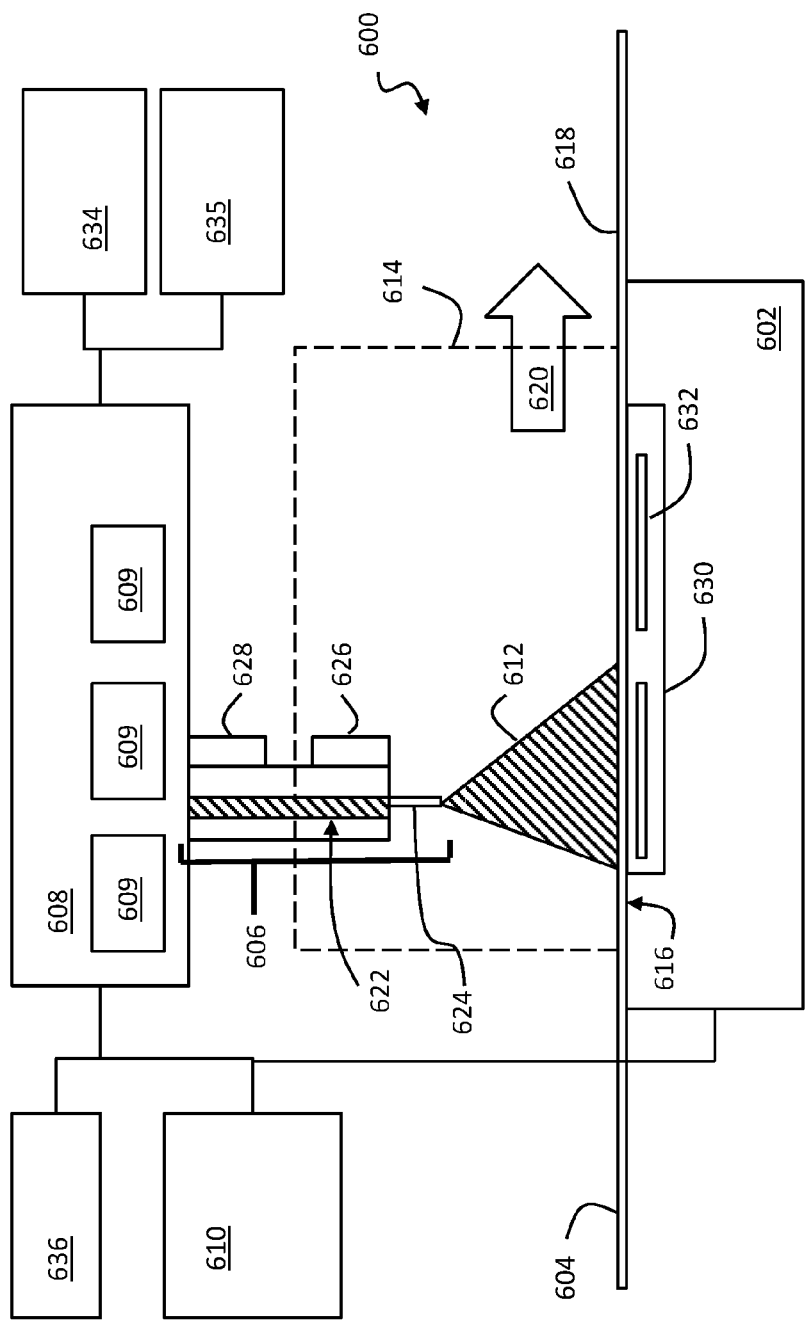
FIG. 6 shows a system for three-dimensional printing.

FIG. 6 shows a system for three-dimensional printing. In general, the printer 600 may include a build platform 602, a conveyor 604, an extruder 606, an x-y-z positioning assembly 608, and a controller 610 that cooperate to fabricate an object 612 within a working volume 614 of the printer 600. The printer 600 may use the in-filling techniques described above to fill void space within enclosed volumes of an object being fabricated.

The build platform 602 may include a surface 616 that is rigid and substantially planar. The surface 616 may support the conveyer 604 in order to provide a fixed, dimensionally and positionally stable platform on which to build the object 612.

The build platform 602 may include a thermal element 630 that controls the temperature of the build platform 602 through one or more active devices 632 such as resistive elements that convert electrical current into heat, Peltier effect devices that can create a heating or cooling effect, or any other thermoelectric heating and/or cooling devices. Thus the thermal element 630 may be a heating element that provides active heating to the build platform 602, a cooling element that provides active cooling to the build platform 602, or a combination of these. The heating element 630 may be coupled in a communicating relationship with the controller 610 in order for the controller 610 to controllably impart heat to or remove heat from the surface 616 of the build platform 602. The thermal element 630 may include an active cooling element positioned within or adjacent to the build platform 602 to controllably cool the build platform 602.

It will be understood that a variety of other techniques may be employed to control a temperature of the build platform 602. For example, the build platform 602 may use a gas cooling or gas heating device such as a vacuum chamber or the like in an interior thereof, which may be quickly pressurized to heat the build platform 602 or vacated to cool the build platform 602 as desired. As another example, a stream of heated or cooled gas may be applied directly to the build platform 602 before, during, and/or after a build process. Any device or combination of devices suitable for controlling a temperature of the build platform 602 may be adapted to use as the thermal element 630 described herein.

The conveyer 604 may be formed of a sheet 618 of material that moves in a path 620 through the working volume 614. Within the working volume 614, the path 620 may pass proximal to the surface 616 of the build platform 602—that is, resting directly on or otherwise supported by the surface 616—in order to provide a rigid, positionally stable working surface for a build. It will be understood that while the path 620 is depicted as a unidirectional arrow, the path 620 may be bidirectional, such that the conveyer 604 can move in either of two opposing directions through the working volume 614. It will also be understood that the path 620 may curve in any of a variety of ways, such as by looping underneath and around the build platform 602, over and/or under rollers, or around delivery and take up spools for the sheet 618 of material. Thus, while the path 620 may be generally (but not necessarily) uniform through the working volume 614, the conveyer 604 may move in any direction suitable for moving completed items from the working volume 614. The conveyor may include a motor or other similar drive mechanism (not shown) coupled to the controller 610 to control movement of the sheet 618 of material along the path 620. Various drive mechanisms are shown and described in further detail below.

In general, the sheet 618 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 618 may have a thickness of about three to seven thousandths of an inch, or any other thickness that permits the sheet 618 to follow the path 620 of the conveyer 604. For example, with sufficiently strong material, the sheet 618 may have a thickness of one to three thousandths of an inch. The sheet 618 may instead be formed of sections of rigid material joined by flexible links.

A working surface of the sheet 618 (e.g., an area on the top surface of the sheet 618 within the working volume 614) may be treated in a variety of manners to assist with adhesion of build material to the surface 618 and/or removal of completed objects from the surface 618. For example, the working surface may be abraded or otherwise textured (e.g., with grooves, protrusions, and the like) to improve adhesion between the working surface and the build material.

A variety of chemical treatments may be used on the working surface of the sheet 618 of material to further facilitate build processes as described herein. For example, the chemical treatment may include a deposition of material that can be chemically removed from the conveyer 604 by use of water, solvents, or the like. This may facilitate separation of a completed object from the conveyer by dissolving the layer of chemical treatment between the object 612 and the conveyor 604. The chemical treatments may include deposition of a material that easily separates from the conveyer such as a wax, mild adhesive, or the like. The chemical treatment may include a detachable surface such as an adhesive that is sprayed on to the conveyer 604 prior to fabrication of the object 612.

In one aspect, the conveyer 604 may be formed of a sheet of disposable, one-use material that is fed from a dispenser and consumed with each successive build.

In one aspect, the conveyer 604 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 604 may be used in a variety of different build processes by selecting the various working areas as needed or desired.

The extruder 606 may include a chamber 622 in an interior thereof to receive a build material. The build material may, for example, include acrylonitrile butadiene styrene ("ABS"), high-density polyethylene ("HDPL"), poly-lactic acid ("PLA"), or any other suitable plastic, thermoplastic, or other material that can usefully be extruded to form a three-dimensional object. The extruder 606 may include an extrusion tip 624 or other opening that includes an exit port with a circular, oval, slotted or other cross-sectional profile that extrudes build material in a desired cross-sectional shape.

The extruder 606 may include a heater 626 to melt thermoplastic or other meltable build materials within the chamber 622 for extrusion through an extrusion tip 624 in liquid form. While illustrated in block form, it will be understood that the heater 626 may include, e.g., coils of resistive wire wrapped about the extruder 606, one or more heating blocks with resistive elements to heat the extruder 606 with applied current, an inductive heater, or any other arrangement of heating elements suitable for creating heat within the chamber 622 to melt the build material for extrusion. The extruder 606 may also or instead include a motor 628 or the like to push the build material into the chamber 622 and/or through the extrusion tip 624.

In general operation (and by way of example rather than limitation), a build material such as ABS plastic in filament form may be fed into the chamber 622 from a spool or the like by the motor 628, melted by the heater 626, and extruded from the extrusion tip 624. By controlling a rate of the motor 628, the temperature of the heater 626, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. As noted above, other techniques may be employed for three-dimensional printing, including extrusion-based techniques using a build material that is curable and/or a build material of sufficient viscosity to retain shape after extrusion.

The x-y-z positioning assembly 608 may generally be adapted to three-dimensionally position the extruder 606 and the extrusion tip 624 within the working volume 614. Thus by controlling the volumetric rate of delivery for the build material and the x, y, z position of the extrusion tip 624, the object 612 may be fabricated in three dimensions by depositing successive layers of material in two-dimensional patterns derived, for example, from cross-sections of a computer model or other computerized representation of the object 612. A variety of arrangements and techniques are known in the art to achieve controlled linear movement along one or more axes. The x-y-z positioning assembly 608 may, for example, include a number of stepper motors 609 to independently control a position of the extruder within the working volume along each of an x-axis, a y-axis, and a z-axis. More generally, the x-y-z positioning assembly 608 may include without limitation various combinations of stepper motors, encoded DC motors, gears, belts, pulleys, worm gears, lead screws, threads, and so forth. Any such arrangement suitable for controllably positioning the extruder 606 within the working volume 614 may be adapted to use with the printer 600 described herein.

By way of example and not limitation, the conveyer 604 may be affixed to a bed that provides x-y positioning within the plane of the conveyer 604, while the extruder 606 can be independently moved along a z-axis. As another example, the extruder 606 may be stationary while the conveyer 604 is x, y, and z positionable. As another example, the extruder 606 may be x, y, and z positionable while the conveyer 604 remains fixed (relative to the working volume 614). In yet another example, the conveyer 604 may, by movement of the sheet 618 of material, control movement in one axis (e.g., the y-axis), while the extruder 606 moves in the z-axis as well as one axis in the plane of the sheet 618. Thus in one aspect, the conveyer 604 may be attached to and move with at least one of an x-axis stage (that controls movement along the x-axis), a y-axis stage (that controls movement along a y-axis), and a z-axis stage (that controls movement along a z-axis) of the x-y-z positioning assembly 608. In still another example, the extruder may be moveable along x- and y-axes, while the object remains on a build platform moveable along a z-axis. More generally, any arrangement of motors and other hardware controllable by the controller 610 may serve as the x-y-z positioning assembly 608 in the printer 600 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 610 may be electrically coupled in a communicating relationship with the build platform 602, the conveyer 604, the x-y-z positioning assembly 608, and the other various components of the printer 600. In general, the controller 610 is operable to control the components of the printer 600, such as the build platform 602, the conveyer 604, the x-y-z positioning assembly 608, and any other components of the printer 600 described herein to fabricate the object 612 from the build material. The controller 610 may include any combination of software and/or processing circuitry suitable for controlling the various components of the printer 600 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, the controller 610 may include a microprocessor or other processing circuitry with sufficient computational power to provide related functions such as executing an operating system, providing a graphical user interface (e.g., to a display coupled to the controller 610 or printer 600), convert three-dimensional models into tool instructions, and operate a web server or otherwise host remote users and/or activity through the network interface 636 described below.

The controller 610 may also or instead control processing of three-dimensional computer models, such as by converting from one computerized representation (e.g., a CAD model in STL format or the like) to another computerized representation (e.g., g-code or other tool instructions). In this conversion, the controller 610 may adapt the initial computerized representation in any manner suitable for fabrication, such as by determining suitable in-filling of enclosed volumes and generating corresponding tool instructions. The controller 610 may also receive tool instructions, and modify the tool instructions to locally apply any desired in-filling patterns or techniques.

A variety of additional sensors may be usefully incorporated into the printer 600 described above. These are generically depicted as sensor 634 in FIG. 6, for which the positioning and mechanical/electrical interconnections with other elements of the printer 600 will depend upon the type and purpose of the sensor 634 and will be readily understood and appreciated by one of ordinary skill in the art. The sensor 634 may include a temperature sensor positioned to sense a temperature of the surface of the build platform 602. This may, for example, include a thermistor or the like embedded within or attached below the surface of the build platform 602. This may also or instead include an infrared detector or the like directed at the surface 616 of the build platform 602 or the sheet 618 of material of the conveyer 604. Other sensors that may be usefully incorporated into the printer 600 as the sensor 634 include a heat sensor, a volume flow rate sensor, a weight sensor, a sound sensor, light sensor, wear sensor, pressure sensor, humidity sensor, and a motion sensor. Certain more specific examples are provided below by way of example and not of limitation.

The sensor 634 may include a sensor to detect a presence (or absence) of the object 612 at a predetermined location on the conveyer 604. This may include an optical detector arranged in a beam-breaking configuration to sense the presence of the object 612 at a location such as an end of the conveyer 604. This may also or instead include an imaging device and image processing circuitry to capture an image of the working volume 614 and analyze the image to evaluate a position of the object 612. This sensor 634 may be used for example to ensure that the object 612 is removed from the conveyer 604 prior to beginning a new build at that location on the working surface such as the surface 616 of the build platform 602. Thus the sensor 634 may be used to determine whether an object is present that should not be, or to detect when an object is absent. The feedback from this sensor 634 may be used by the controller 610 to issue processing interrupts or otherwise control operation of the printer 600.

The sensor 634 may include a sensor that detects a position of the conveyer 604 along the path. This information may be obtained from an encoder in a motor that drives the conveyer 604, or using any other suitable technique such as a visual sensor and corresponding fiducials (e.g., visible patterns, holes, or areas with opaque, specular, transparent, or otherwise detectable marking) on the sheet 618.

The sensor 634 may include a heater (instead of or in addition to the thermal element 630) to heat the working volume 614 such as a radiant heater or forced hot air to maintain the object 612 at a fixed, elevated temperature throughout a build. The sensor 634 may also or instead include a cooling element to maintain the object 612 at a predetermined sub-ambient temperature throughout a build.

The sensor 634 may also or instead include at least one video camera. The video camera may generally capture images of the working volume 614, the object 612, or any other hardware associated with the printer 600. The video camera may provide a remote video feed through the network interface 636, which feed may be available to remote users through a user interface maintained by, e.g., remote hardware such as the print servers or other remotely hosted print administration systems, or within a web page provided by a web server hosted by the three-dimensional printer 600. Thus in one aspect there is disclosed herein a user interface adapted to present a video feed from at least one video camera of a three-dimensional printer to a remote user through a user interface.

The sensor 634 may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 614. In another aspect, the sensor 634 may include a machine vision system that captures images and analyzes image content to obtain information about the status of a job, working volume 614, or an object 612 therein. The machine vision system may support a variety of imaging-based automatic inspection, process control, and/or robotic guidance functions for the three-dimensional printer 600 including without limitation pass/fail decisions, error detection (and corresponding audible or visual alerts), shape detection, position detection, orientation detection, collision avoidance, and so forth.

Other components, generically depicted as other hardware 635, may also be included, such as input devices including a keyboard, touchpad, mouse, switches, dials, buttons, motion sensors, microphones, and the like, as well as output devices such as a display, a speaker or other audio transducer, light emitting diodes, and so forth. Other hardware 635 may also or instead include a variety of cable connections and/or hardware adapters for connecting to, e.g., external computers, external hardware, external instrumentation or data acquisition systems, and so forth.

The printer 600 may include, or be connected in a communicating relationship with, a network interface 636. The network interface 636 may include any combination of hardware and software suitable for coupling the controller 610 and other components of the printer 600 to a remote computer in a communicating relationship through a data network. By way of example and not limitation, this may include electronics for a wired or wireless Ethernet connection operating according to the IEEE 802.11 standard (or any variation thereof), or any other short or long range wireless communication components or the like. This may include hardware for short range data communications such as BlueTooth or an infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 610 may be configured to control participation by the printer 600 in any network to which the network interface 636 is connected, such as by autonomously connecting to the network to retrieve printable content, or responding to a remote request for status or availability.

The in-filling techniques described above may be suitably deployed on a printer such as the printer 600 described above. Thus in one aspect, there is disclosed herein a three-dimensional printer including a build platform, an extruder, an x-y-z positioning assembly, and a controller configured to operate the x-y-z positioning assembly and the extruder to fabricate a three-dimensional object on the build platform from a three-dimensional model, wherein the controller in-fills one or more enclosed volumes of the three-dimensional object using any of the techniques described above.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In some embodiments disclosed herein are computer program products comprising computer-executable code or computer-usable code that, when executing on one or more computing devices (such as the devices/systems described above), performs any and/or all of the steps described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the steps or computer program code described above may be embodied in any suitable transmission or propagation medium carrying the computer-executable code, or instructions or data therefor, described above and/or any inputs or outputs from same.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The meanings of method steps of the invention(s) described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

Thus for example, a description or recitation of "adding a first number to a second number" includes causing one or more parties or entities to add the two numbers together. For example, if person X engages in an arm's length transaction with person Y to add the two numbers, and person Y indeed adds the two numbers, then both persons X and Y perform the step as recited: person Y by virtue of the fact that he actually added the numbers, and person X by virtue of the fact that he caused person Y to add the numbers. Furthermore, if person X is located within the United States and person Y is located outside the United States, then the method is performed in the United States by virtue of person X's participation in causing the step to be performed.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. A method for dynamically generating a pattern for an infill structure in a fused deposition modeling-process based on layered extrusion of a build material, the method comprising:
   identifying a surface of a desired structure, the desired structure having an unspecified interior configuration;
   enclosing the desired structure in a cell;
   identifying an interior configuration by iteratively:
      partitioning the cell into sub-cells;
      discarding sub-cells that are entirely contained in an exterior of the structure; and
      merging sub-cells that:
         are entirely contained in an interior of the structure; and
         satisfy a merging condition;
   determining whether a stopping condition is satisfied;

if the stopping condition is not satisfied, repeating steps to identify the interior configuration until the stopping condition is satisfied; and if the stopping condition is satisfied, printing the structure with the identified interior configuration on a three-dimensional printer such that the interior of the structure includes a support structure formed by remaining walls of the sub-cells and enclosing one or more void volumes within the structure.

2. The method of claim 1, wherein the cell and sub-cells are cubical.

3. The method of claim 2, wherein partitioning cells includes partitioning a cube into eight mutually congruent cubes.

4. The method of claim 1, wherein the merging condition includes the condition that a given cell is adjacent to a specified number of other cells that are all contained in the interior of the structure.

5. The method of claim 4, wherein the specified number is seven.

6. The method of claim 1, wherein the merging the sub-cells is performed only in a specified direction.

7. The method of claim 6, wherein the specified direction is selected from the group consisting of horizontal and vertical.

8. The method of claim 1, wherein the cell and sub-cells are tetrahedral.

9. The method of claim 8, wherein partitioning includes barycentric subdivision.

10. The method of claim 1, wherein the stopping condition allows partitioning to be carried out to a maximum resolution of the three-dimensional printer.

11. The method of claim 1, wherein the stopping condition includes a constraint on at least one of a total required build material, a total required build time, a desired density of the structure, a minimum void volume, and a maximum void volume.

12. The method of claim 1, wherein the merging condition includes a constraint selected from the group consisting of: a constraint on an overall mass of the structure, a constraint on a density of the structure, and a constraint on a location of a center of mass of the structure.

\* \* \* \* \*